UNITED STATES PATENT OFFICE.

JOHN S. SELLON, OF HATTON GARDEN, COUNTY OF MIDDLESEX, ENGLAND.

SOLDER FOR ALUMINUM.

SPECIFICATION forming part of Letters Patent No. 333,786, dated January 5, 1886.

Application filed October 26, 1885. Serial No. 180,986. (No specimens.)

*To all whom it may concern:*

Be it known that I, JOHN SCUDAMORE SELLON, a subject of the Queen of Great Britain and Ireland, and a member of the firm of Johnson, Matthey & Co., assayers, residing at Hatton Garden, in the county of Middlesex, England, have invented a certain new and useful Improvement in Compounds for Soldering Aluminium, (for which I have applied for Patents in Great Britain, No. 11,499, on the 26th September, 1885; France on the 8th October, 1885; Belgium on the 12th October, 1885, and Germany on the 2d October, 1885,) of which the following is a specification.

My invention relates to a means for soldering the metal aluminium either to itself or to other metals or alloys—such, for example, as gold, silver, platinum, nickel, cobalt, copper, tin, lead, iron, zinc, German silver, brass, or bronze. For this purpose I provide an alloy of zinc consisting of zinc, tin, and lead, which I apply to the aluminium at the part or parts where soldering is to be effected, and I also employ as an intermediary a material which will prevent oxidation of the aluminium.

If necessary, I first clean, by scraping or otherwise, the surface of the aluminium at the part or parts where soldering is to be effected, and I then apply to the said part or parts paraffine-wax or other suitable matter which will liquefy or flow at a low temperature. I then apply the prepared alloy to the part or parts where soldering is to be effected, and I then apply heat. Before the heating has reached a degree sufficient to injure or oxidize aluminium the paraffine-wax or its equivalent will be melted, and will exclude air while and until the alloy becomes melted and attaches itself to the aluminium. Where aluminium is to be joined to aluminium, both surfaces to be attached will be thus treated; but where aluminium is to be joined to other metal or alloy which can ordinarily be united by soldering, the aluminium only need be prepared in this way. The pieces of metal with the aluminium so prepared can be attached by any ordinary or suitable solder.

It will be understood that, if desired, the alloy may be coated with the paraffine-wax or its equivalent in substitution for or in addition to the coating of the aluminium surface.

While not limiting myself to the following procedure, I will give the best means with which I am acquainted for carrying my invention into effect as applied to soldering two pieces of aluminium together. I prepare an alloy of five parts zinc, two parts tin, and one part lead, and this I roll into thin sheets. I then scrape the parts of the aluminium to be attached, and I coat them with paraffine-wax. I then place on each of the surfaces a piece of the alloy, and I apply heat. The wax first melts, and then, when a higher heat is obtained, the alloy melts, and on cooling will be found to be firmly attached to the aluminium surfaces, which can then be soldered together as ordinary soldering is effected.

Where aluminium is to be soldered to other metals which do not require the foregoing preparation, such preparation is of course only effected with respect to the aluminium surface.

I claim herein—

An alloy or compound for soldering aluminium, consisting of zinc, tin, and lead, in substantially the proportions set forth.

In testimony whereof I have signed my name to this specification in the presence of two subscribing witnesses.

JOHN S. SELLON.

Witnesses:
CLAUDE WOODROW,
PERCY GOLDRING,
*Both of 31 Lombard Street, London.*